(12) United States Patent
Mickan et al.

(10) Patent No.: US 7,738,006 B2
(45) Date of Patent: Jun. 15, 2010

(54) METHODS AND APPARATUS FOR ASCERTAINING SENSOR SIGNAL DELAY IN AN ELECTROPHOTOGRAPHIC DEVICE

(75) Inventors: David J. Mickan, Lexington, KY (US); Eric W. Westerfield, Versailles, KY (US); Daniel E. Pawley, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 537 days.

(21) Appl. No.: 11/509,432

(22) Filed: Aug. 23, 2006

(65) Prior Publication Data
US 2008/0049096 A1 Feb. 28, 2008

(51) Int. Cl.
*B41J 2/47* (2006.01)
*B41J 2/435* (2006.01)
*G02B 26/08* (2006.01)

(52) U.S. Cl. .................... 347/235; 347/250; 359/199.2; 359/214.1; 359/224.1

(58) Field of Classification Search ................. 347/235, 347/243, 250, 259; 359/197, 203, 212, 213, 359/214
See application file for complete search history.

(56) References Cited
U.S. PATENT DOCUMENTS 5,175,570 A * 12/1992 Haneda et al. .............. 347/116
6,803,938 B2 * 10/2004 Turner ........................ 347/237
6,919,977 B2 * 7/2005 Cannon et al. .............. 359/199
2004/0119002 A1 6/2004 Bush et al.
2004/0119811 A1 6/2004 Bush et al.
2004/0119813 A1 6/2004 Bush et al.
2004/0125198 A1 7/2004 Klement
2006/0064019 A1 3/2006 Bush et al.
2006/0114309 A1 6/2006 Bush

* cited by examiner

*Primary Examiner*—Matthew Luu
*Assistant Examiner*—Kendrick X Liu

(57) ABSTRACT

In an electrophotographic (EP) device, methods and apparatus include determining a delay of one or more sensors (hsync) to accurately know when to start the process of scanning latent images. In one aspect, the sensor includes a leading and trailing edge defined along a direction of laser beam scan travel. Determining the delay includes learning a position of a laser beam on the sensor at a time when a controller connected to the sensor receives a signal from the sensor indicating the sensor is being sufficiently impinged upon by the laser beam. It also includes learning a latest possible position of the laser beam along the direction of laser scan travel where the laser beam can be turned on and still have the sensor assert a signal indicating it has been sufficiently impinged upon by the laser beam. Bi-directionally scanning EP devices are also disclosed, including controllers, photoconductors, sensors, etc.

16 Claims, 8 Drawing Sheets

METHODS AND APPARATUS FOR ASCERTAINING SENSOR SIGNAL DELAY IN AN ELECTROPHOTOGRAPHIC DEVICE

FIELD OF THE INVENTION

Generally, the present invention relates to electrophotographic devices, such as laser printers or copy machines. Particularly, it relates to improving print quality in electrophotographic devices, especially those utilizing bidirectional scanning. In one aspect, a scanned beam across a sensor, such as a horizontal synchronization (hsync) sensor, is characterized for calibration. In another, timing relationships for scanning are implemented from the characterization for, among other things, referencing scan start.

BACKGROUND OF THE INVENTION

Typical electrophotographic (EP) devices have a spinning polygon mirror that directs a laser beam on a photoconductor, such as a drum, to create one or more scan lines of a latent to-be-printed image. As is known, multiple scan lines extend in a same direction, e.g., left-to-right, and provide a common referencing of all scan lines relative to a single laser beam sensor position, known typically as a horizontal synchronization (or "hsync") position. Often, the hsync signal is defined in units of time for the engine of the EP device and its apparent location exists in a space somewhere off the edge of the printed page.

However, it has recently been suggested that torsion oscillator or resonant galvanometer structures can replace the traditional spinning polygon mirror. In this manner, scan lines can occur in both the forward and backward directions (e.g., bi-directionally) thereby increasing efficiency of the EP device. Because of their MEMS scale size and fabrication techniques, the structures are also fairly suggested to reduce the relative cost of manufacturing. Unfortunately, scanning in two directions adds complexity to image referencing since two reference points need occur at opposite ends of the printed page and even the slightest of deviations between scan lines amplifies print image imperfections. Also, EP device parameters, such as beam sensor signal delays, optical component alignment, and galvanometer or oscillator scan profile nonlinearity, must be measured and accounted for.

For instance, a laser beam is swept across an hsync sensor to generate an electrical pulse, according to individual characteristics of the sensor, when the beam has passed over a sufficient amount of the sensor with a sufficient amount of light. From when the beam actually first impinges the sensor to the time when the actual electrical pulse is sent, a delay of varying amount occurs. Also, by the time the EP device has processed the pulse, the actual location of the beam has changed.

If this delay were always a fixed amount, then calibrating the sensors would be fairly intuitive. However, it is not fixed and varies according to process conditions, such as the amount of optical power in the laser beam, the spot size of the beam, the temperature of the hsync sensor, and the sensitivity of the hsync sensor.

Accordingly, there exists a need in the art for very accurately knowing the starting location of a scan line for bi-directionally scanning EP devices to improve print quality. Particularly, there are needs by which knowing the starting location relates to characterizing the manner in which a laser beam transits an hsync sensor and correlating the same to electrical pulses sent from or asserted by the sensor. Ultimately, a need further exists to use the foregoing to align the forward and reverse bi-directional scans. Naturally, any improvements should further contemplate good engineering practices, such as relative inexpensiveness, stability, low complexity, ease of implementation, etc.

SUMMARY OF THE INVENTION

The above-mentioned and other problems become solved by applying the principles and teachings associated with the hereinafter-described ascertaining sensor signal delay in an electrophotographic (EP) device. In its most basic sense, an EP device scans multiple scan lines with a laser beam to form latent images on a photoconductor. One or more sensors, such as horizontal synchronization (hsync) sensors, exist relative to the photoconductor to reference the images. Because the sensors have an inherent delay, e.g., a time from when the laser beam first impinges them upon until the time when they actually assert an electrical signal, it is a best practice to understand or characterize the amount of delay so that referencing of images can be as precise as possible. To this end, the present invention is directed to ascertaining the delay of sensors, especially hsync sensors. Ultimately, hard copy, printed image outputs will have high quality. While EP devices that only scan in one direction have but a single point of image reference, the ascertaining of delay is somewhat less important than it is for bi-directionally scanning EP devices having two image references for each of the forward and reverse scans. Namely, unidirectional scanning EP devices have a common delay relative to all scan lines whereas bi-directionally scanning EP devices have no common delay per all of its scan lines. In other words, a common delay in a unidirectional scanning EP device does not prevent decent image registration since the delay in one scan line is the same in another and all the lines fairly register. On the other hand, a delay in a forward scan line of a bi-directionally scanning EP device and a delay in the reverse scan line will cause very imperfect registration between the lines. Nonetheless, the invention has application for all EP devices having sensors, especially when characterizing an unknown parameter affords processing knowledge that can be later used in any applicable manner, including or not better referencing of images.

In various embodiments, the sensor includes a leading and trailing edge defined along a direction of laser scan travel. Ascertaining the delay includes learning a position of a laser beam on the sensor at a time when a controller connected to the sensor receives a signal from the sensor that indicates the sensor has been sufficiently impinged upon by the laser beam. It also includes learning a latest possible position of the laser beam, along the direction of laser scan travel, where the laser beam can be turned on and still have a signal sent from the sensor that indicates the sensor has been sufficiently impinged upon by the laser beam. Representatively, multiple instances of scanning the laser beam across the sensor occur to get a sufficient amount of data and a controller interprets the data, such as through averaging, interpolating, etc. Scanning also occurs in both the forward and reverse scan directions. Scanning also relates relevantly to using an actual leading and trailing edge of the sensor and to characterizing an apparent leading and trailing edge between a sensor center and the actual leading and trailing edges, respectively.

In timing, the apparent leading edge corresponds to the time when the sensor first asserts an electrical signal after having been impinged upon sufficiently by the light, temperature and/or other characteristics of the laser beam as the laser beam scans from the actual leading edge to the apparent leading edge. The apparent trailing edge, on the other hand, is that position corresponding to the latest possible position of the scanning laser beam across the sensor that will actually cause the sensor to assert a signal indicating it is being impinged upon sufficiently by the laser beam. In other words, a position on a sensor just slightly closer to the actual trailing edge, as the laser beam scans from the actual leading edge to the actual trailing edge, corresponds to a position where the sensor (for whatever reason) will have an insufficient amount of being impinged upon by the laser beam to actually assert a signal to a controller, or elsewhere. In turn, knowing both the apparent leading and trailing edges, and taking advantage of the symmetry of the sensor, the actual center of the sensor can also be learned. Thereafter, this information is used to accurately reference the scan starting in an EP device.

Representative EP devices also contemplate various arrangements of sensors, photoconductors, laser beams, controllers, resonant galvanometers, torsion oscillators, etc.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention. In accordance with the present invention, ascertaining sensor delay, especially horizontal synchronization (hsync) sensor delay, in an electrophotographic (EP) device is hereafter described.

Figure 1:
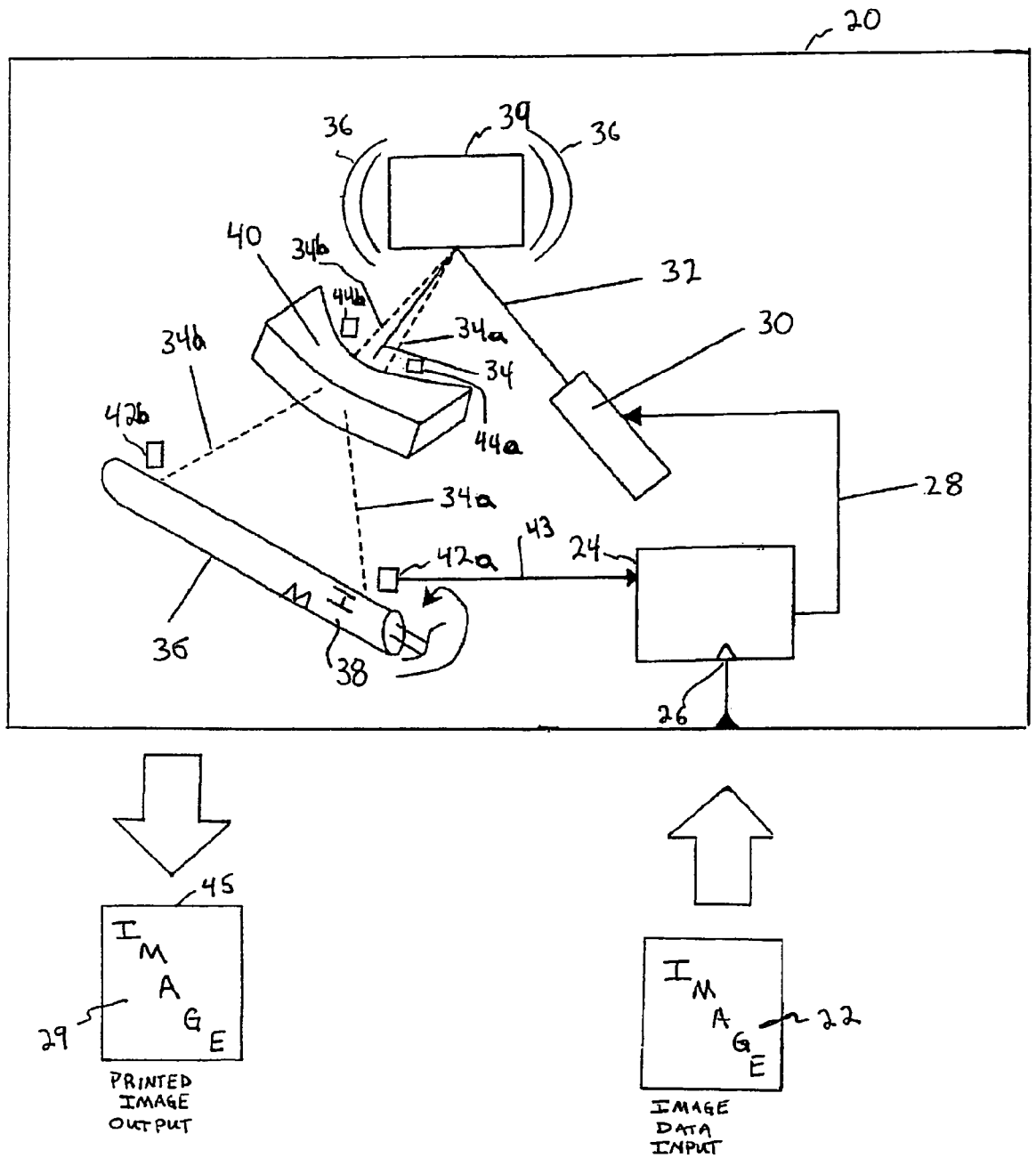
FIG. 1 is a diagrammatic view in accordance with the present invention of a representative EP device.

With reference to FIG. 1, an EP device 20 of the invention representatively includes mono or color laser printers or copier machines. During use, image data 22 is supplied to the EP device from somewhere external, such as from an attendant computer, camera, scanner, PDA, laptop, etc. A controller 24 receives the image data at an input 26 and configures an appropriate output signal 28 to produce a latent image of the image data. Ultimately, a hard-copy printed image 29 of the image data is obtained from the latent image. If print alignment in the EP device is well calibrated, the printed image 29 corresponds nearly exactly with the image data input 22. If not, the printed image has a variety of misalignments.

With more specificity, the output signal 28 energizes a laser 30 to produce a beam 32 directed at a torsion oscillator or resonant galvanometer 39. As the oscillator or galvanometer moves (indicated by oscillation wave lines 36) the beam 32 is reflectively cast to create beam lines 34*a*, 34*b* on either side of a central position 34. As a result, multiple scan lines in alternate directions are formed on a photoconductor 36, such as a drum, and together represent a latent image 38 of the image data supplied to the controller. Optically, certain lenses 40, mirrors or other structures exist intermediate to the photoconductor to transform the rotational scan of the laser beam reflected from the oscillator or galvanometer 39 into a substantially linear scan of the beam at the photoconductor 36, with substantially uniform linear scan velocity and with substantially uniform laser beam spot size along the imaging area of the drum. To provide common reference for the beam lines, various sensors are employed. Preferably, a forward hsync sensor 42*a* and a reverse hsync sensor 42*b* are positioned near opposite ends of the photoconductor to provide a common reference for all forward scanning beam lines and all backward scanning beam lines, respectively. In addition to, or in lieu of the sensors 42*a*, 42*b*, forward and reverse hsync sensors may be positioned at 44*a* and 44*b*, upstream of the representative optics 40. Alternatively still, a single hsync sensor might be employed with one or more mirrors emplaced variously to act as a second hsync sensor. Regardless, the outputs of these sensors (representatively given as line 43 from hsync sensor 42*a*) are supplied to the controller 24 for referencing correct locations of the scan line(s) of the latent images. Downstream of the latent image, and not shown, the printed image is formed by applying toner to the latent image and transferring it to a media, such as a sheet of paper. Thereafter, the media 45 with the printed image 29 exits the EP device, where users handle it for a variety of reasons. Unfortunately, the printed image 29 is not always an accurate representation of the image data input 22 and various manufacturing, servicing or end-user operations are used to tightly calibrate the EP device. In this regard, measuring the delay of one or more of the hsync sensors is described hereafter.

Figure 2:
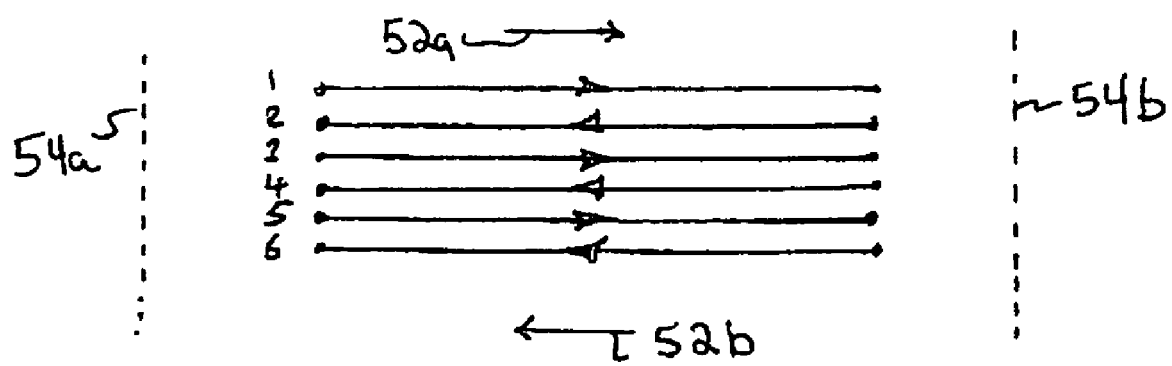
FIG. 2 is a diagrammatic view in accordance with the present invention of desirable scan lines and reference positions in a bi-directionally scanning EP device.

Before then, FIG. 2 conceptually shows the desired scan lines and reference positions in a bi-directionally scanning EP device and fairly suggests the nomenclature for use with later figures. Namely, a plurality of scan lines forming a latent image on a photoconductor, for example, are sequentially numbered 1-6, with odd numbered scan lines (1, 3, and 5) occurring in a forward scan direction 52*a* opposite the even numbered scan lines (2, 4, and 6) occurring in a backward scan direction 52*b*. Also, the forward and reverse scan lines alternate with one another and such is the nature of scanning with the torsion oscillator or resonant galvanometer and its attendant formation of forward-scanning beam lines 34*a* and backward- or reverse-scanning beam lines 34*b*. Also, the reference position 54*a* supplies a common reference point for each of the forward scanning lines and is borne about by the signal from the forward hsync sensor. Conversely, the reference position 54*b* supplies a common reference point for each of the backward scanning lines and is borne about by the signal from the reverse hsync sensor.

Figure 3:
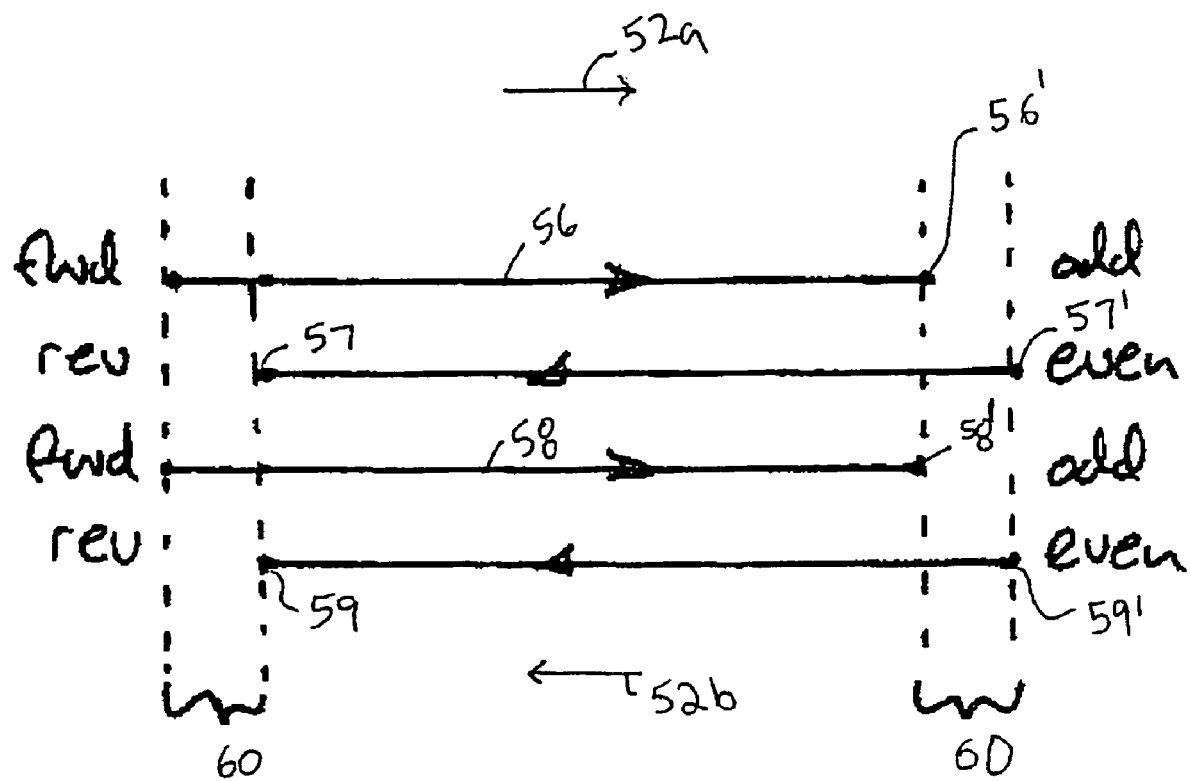
FIG. 3 is a diagrammatic view in accordance with the present invention of a representative potential misalignment in a bi-directionally scanning EP device overcome by knowing the delay of an hsync sensor.

With reference to FIG. 3, one potential misalignment of bi-directional scans in an EP device attempted to be overcome by ascertaining sensor delay is straight bi-directional misalignment. That is, it is undesirable to have the end points 56', 58' of the forward (fwd) scan lines 56, 58 avoid coinciding, vertically, with the start points 57', 59' of the reverse (rev) scan lines 57, 59. While the scan lines are all of relatively equal length, there exists an amount of mismatch 60 at each end of the scans that prevents pixels in adjacent scan lines from properly registering, thereby creating poor image quality. Among other things, a lack of knowledge regarding the delay of the hsync sensor contributes to this type of misalignment.

Figure 4:
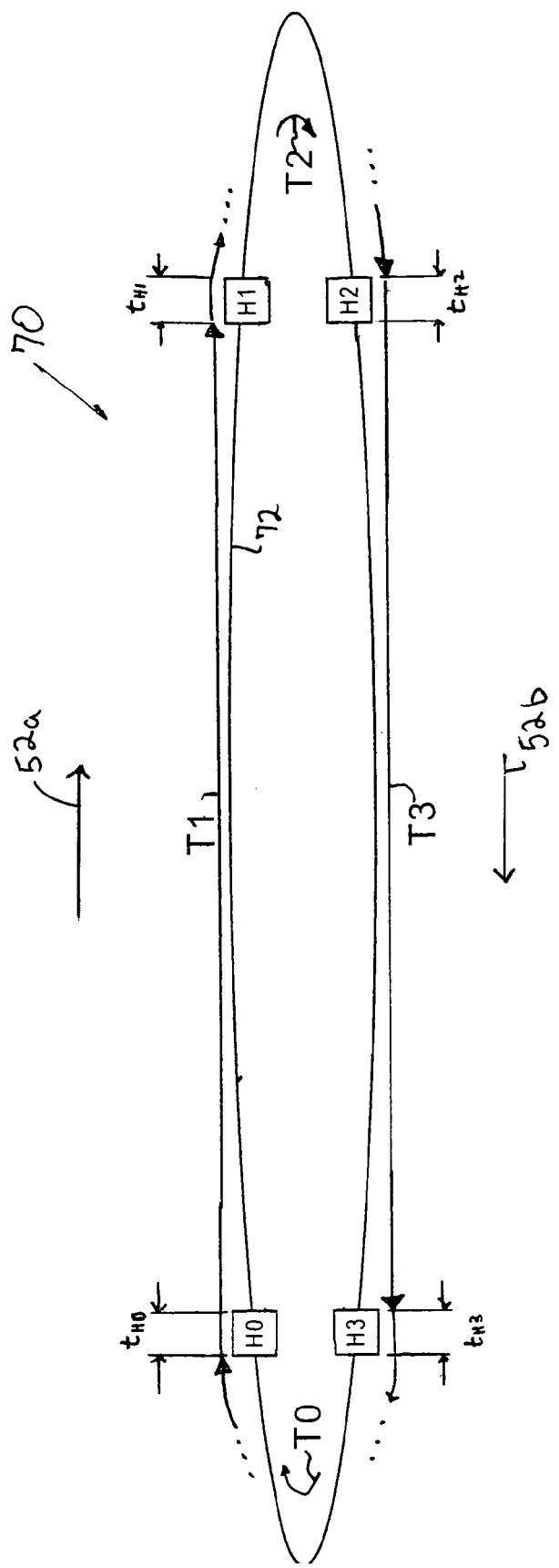
FIG. 4 is a diagrammatic view in accordance with the present invention of the timing relationship between various hsync sensor signals in a bi-directionally scanning EP device.

With reference to FIG. 4, a simplified, conceptual timing diagram relative to hsync sensor signals in an EP device is given generally as 70. Namely, there exists four time periods T0, T1, T2 and T3 that are regularly repeated as a laser beam scans back and forth in a bi-directionally scanning EP device. The time periods are also divided relative to the electrical signals of four hsync sensors, given as H0, H1, H2, and H3, that are asserted by the sensors upon being sufficiently impinged upon by the laser beam. As before, however, four actual sensors can exist to create the signals or some other optical equivalent whereby one or more hsync sensors, and deliberately positioned mirrors, lenses, etc., enable the creation of four discrete hsync sensor signals while fewer than four actual sensors exist. Also, the diagram 70 is that of a timing chart superimposed upon the notion that a laser beam scans in the EP in a first forward direction of scan travel 52*a* from a first position (e.g., 54*a*, FIG. 2) referenced by a first hsync sensor signal (HO) to a second position (e.g., 54*b*, FIG. 2) referenced by a second hsync sensor signal (H1). This is also known as time T1. Such time is also fixed, known and controlled (closed loop) by the controller of the EP device. From there, the laser beam slows and reverses course to begin a second scan in a reverse direction of scan travel according to direction 52*b* and this time is known as T2. From there, time T3 corresponds to a laser scan in a second reverse direction of scan travel 52*b* from a second position (e.g., 54*b*, FIG. 2) referenced by a third hsync sensor signal (H2) back to the first position (e.g., 54*a*, FIG. 2) referenced by a fourth and final hsync sensor signal (H3). From there, the laser beam slows and reverses course to begin another scan in the forward direction of scan travel 52*a* and such is referenced by the H0 sensor signal beginning again. Of course, this process repeats often during scanning, given by loop 72, and the diagram shows that per every cycle of the galvanometer or oscillator (e.g., 39, FIG. 1) the laser beam (either 34*a* or 34*b*, FIG. 1) crosses one or more hsync sensors such that four hsync sensor signals are created, each labeled H0 through H3. In turn, four distinct and regularly repeated time periods T0 through T3 occur per each cycle of the galvanometer or oscillator and such will be used in determining sensor delay. Time periods T1 and T3 also represent a portion of the time during which the laser beam scans across the imaging region of the photoconductor. Lastly, the time length of the sensor signals H0, H1, H2, and H3 is also representatively given as a time of length tH0, tH1, tH2, and tH3, respectively.

Figure 5:
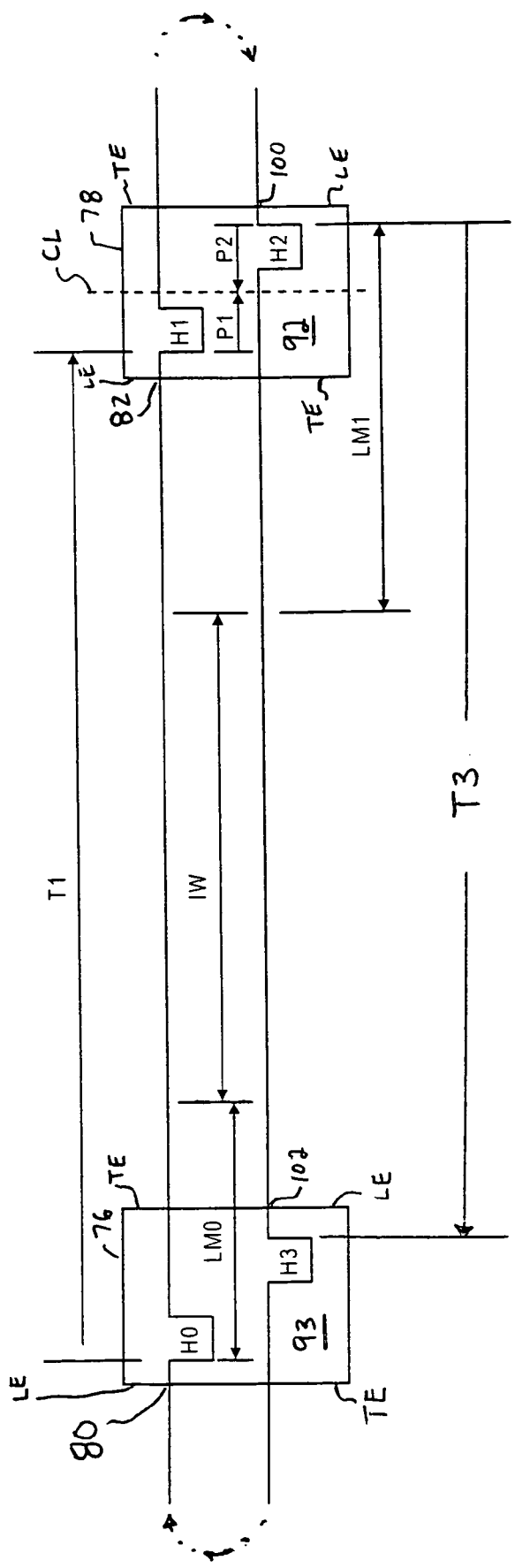
FIG. 5 is a timing diagram in accordance with the present invention of various hsync signals with superimposed hsync sensors in a bi-directionally scanning EP device.

With reference to FIG. 5, the conceptual timing diagram of FIG. 4 is enhanced according to a superimposed physical notion of hsync sensors 76 and 78. That is, while time T1 is still a fixed, known and controlled time beginning upon the assertion of an electrical signal H0 by an hsync sensor (e.g., forward hsync sensor FIG. 1), and ending upon the assertion of a next electrical signal H1 by an hsync sensor (e.g., reverse hsync sensor, FIG. 1), there exists a portion of time, beginning at point 80, to the actual assertion of the hsync sensor signal at H0 that relates to the characterization of the sensor as a laser beam passes along the sensor. Similarly, there exists a portion of time, beginning at point 82, to the actual assertion of the hsync sensor signal at H1 that relates to the characterization of the sensor as a laser beam passes along this other sensor. Namely, and with combined reference to FIG. 6, a laser beam LB is turned on at least as of some point A before crossing a periphery 90 of an hsync sensor 92. (Skilled artisans will appreciate that after imaging a scan line of image input data in an EP device, but before the laser beam would otherwise reach the hsync sensor, the laser beam is turned off so that ghost or other dissatisfactory images do not appear in the latent image being produced. But, because the laser beam needs to be on for an hsync sensor to assert its signal, the laser beam is turned backed on at some point in its direction of travel, such as at A, so the hsync sensor signal can indeed be asserted for purposes of registering alignment. To the extent hsync sensors miss the passage of the laser beam, and exert no signal, controllers stand ready to issue a false hsync sensor signal during a time window of hsync sensor signal expectancy so that ASIC firmware or other controller software does not get "lost" in its scanning of latent images.) Over time, the laser beam follows along the sensor in the direction of scan travel 94 defined from a leading edge LE of the sensor to a trailing edge TE. However, a time delay exists from when the laser beam first impinges upon the sensor 92 at the leading edge to when the sensor itself, according to inherent properties of the sensor, recognizes the presence of the laser and concludes it has been sufficiently impinged upon by the laser beam to affirmatively assert an electrical signal, such as H0 or H1. The delay, therefore, is that which exists in the timing diagram of FIG. 5 between points 80 and 82 and the start of hsync sensor signals H0 and H1, respectively. Also, the position of the laser beam LB on the sensor at the time when the sensor asserts its signal, occurs at position B and such is labeled the "apparent leading edge" of the sensor.

Figure 7:
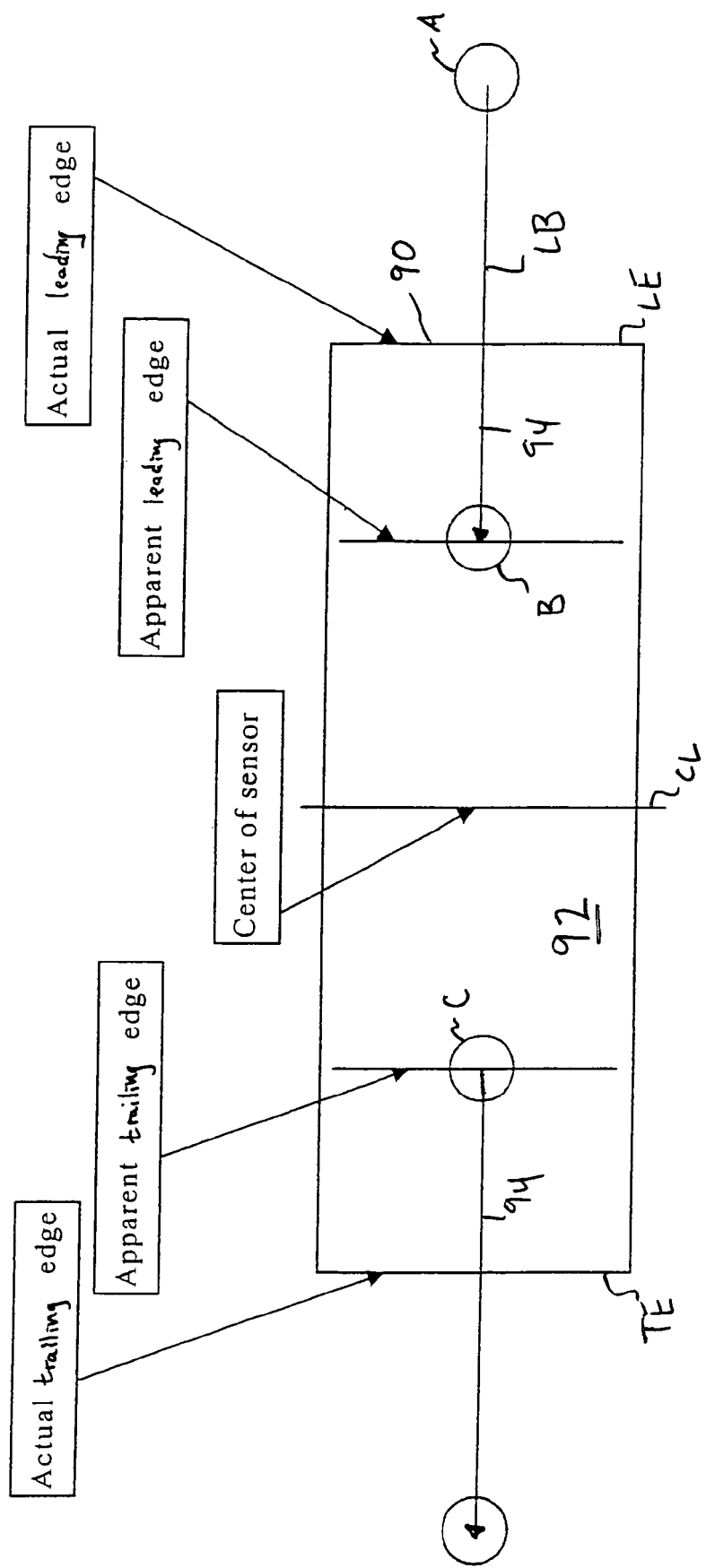

Similarly, on the return trip of the laser beam to create a reverse scan line, during time T3, another time delay exists from when the laser beam first impinges upon the sensor 92 at the leading edge to when the sensor itself, according to inherent properties of the sensor, recognizes the presence of the laser and concludes it has been sufficiently impinged upon by the laser beam to affirmatively assert an electrical signal, such as H2 or H3. Namely, and with combined reference to FIGS. 5 and 7, the laser beam LB is turned on at least as of some point A before crossing a periphery 90 of the hsync sensor 92. Over time, it follows along the sensor in a direction of scan travel 94, defined from a leading edge LE to a trailing edge TE, and a delay, exists in the timing diagram of FIG. 5 between point 100 and the start of hsync sensor signal H2. (The same is also true for the time between point 102 and the start of hsync sensor signal H3 relative to another actual or virtual hsync sensor 93.) Also, the position of the laser beam LB on the sensor at the time when the sensor asserts its signal, occurs at position B and such is labeled the apparent leading edge of the sensor.

As a further parameter, there exists a time P1 and P2 from the time of assertion of a respective hsync sensor signal H1 or H2 and a time when the laser beam itself is over a center of the sensor 92, given as centerline CL. By knowing these times, which were unknown heretofore, a precise imaging reference for forward and reverse scans in a bi-directionally scanning EP device can be fairly characterized. To ascertain these times, however, it is to be appreciated that some fixed point in space is needed. While this can be the leading edge, trailing edge, or any arbitrary point of the sensor, for example, the center is representatively chosen.

Continuing, the nomenclature of the center and the leading and trailing edges of the sensor has been described, as has been the apparent leading edge. What remains to be identified, in order to learn the times P1 and P2, is the "apparent trailing edge." In this regard, the apparent trailing edge is a last scan position at which the laser beam can be turned on such that an hsync sensor signal is still generated by the sensor as the laser beam is swept off the periphery 90 of the sensor at the actual trailing edge, and in a direction of travel 94, for instance. In other words, the apparent trailing edge is a latest possible position of the laser beam, along the direction of laser scan travel, where the laser beam can be turned on and still have a signal sent from the sensor that indicates the sensor has been sufficiently impinged upon by the laser beam. In still other words, a position 106 on the sensor 92 just slightly closer to the actual trailing edge, as the laser beam scans from the actual leading edge to the actual trailing edge, corresponds to a position where the sensor will have an insufficient amount of being impinged upon by the laser beam (for whatever reason) to actually assert a signal to a controller, or elsewhere. In turn, knowing both the apparent leading and trailing edges, and taking advantage of the symmetry of the sensor, the actual center of the sensor can be learned. Thereafter, this information is used to accurately reference the scan starting in an EP device.

To actually find the apparent leading and trailing edges, an automatic or user-initiated calibration cycle of the EP device is preferably entered. In this manner, the EP device can be regularly updated and synched. Since it has been estimated that the overall time for making the calibration is on the order of a few seconds, the cycle can be done at any time during manufacturing, servicing or end-user operation, and without much interference to otherwise creating actual image outputs.

During the calibration, the apparent leading edge is found relatively simply. For instance, a laser beam is turned on some distance before it is over a sensor, such as at A, and multiple instances of forward and reverse scans of the laser beam over one or more sensors is affected. In turn, each of the times observed corresponding to time periods T0, T1, T2, or T3 are then sampled X number of times and averaged. For example if the apparent leading edge LE relative to sensor 92 is being measured for its hsync sensor signal H1, then T1 is repeatedly measured and sampled X number of times.

Figure 6:
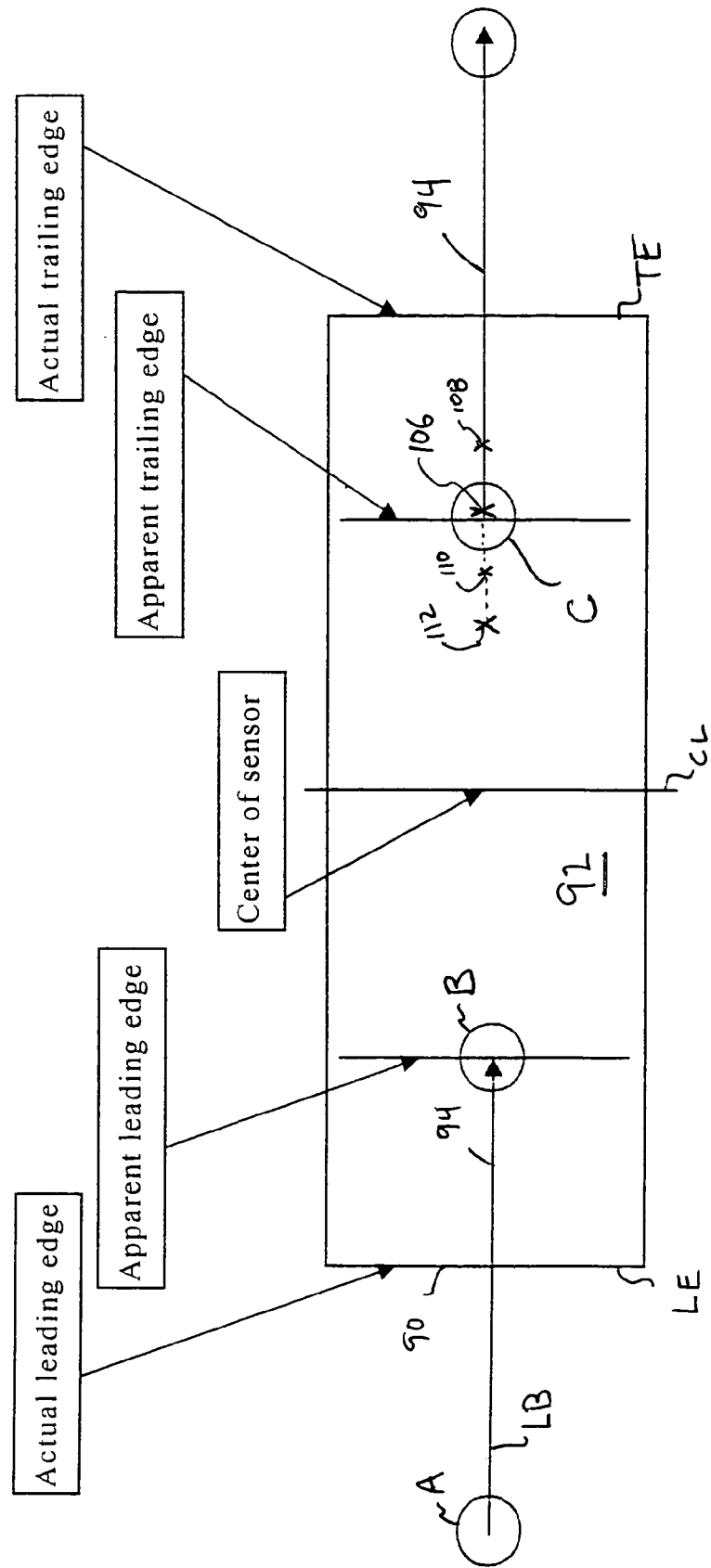
FIGS. 6 and 7 are diagrammatic views in accordance with the present invention of a representative scanned beam across an hsync sensor and the relationships thereof.

To find the apparent trailing edge, it is not important what times exist for relative time periods. What is important is whether a sensor can assert an hsync sensor signal before the beam leaves the sensor periphery, as it travels from some turn-on point to the actual trailing edge of the sensor. In this regard, the controller 24 (via an appropriate algorithm) causes the turning on of the laser beam at different locations along the direction of laser scan travel 94 to determine if the sensor 92, for example, has been impinged upon sufficiently by the laser beam to send an hsync sensor signal. In FIG. 6, this is seen as delaying the laser beam in its otherwise direction of travel (skilled artisans will recognize that a laser beam itself is not traveling along a direction of travel if it is turned off, but because the oscillator or galvanometer is moving, upon the turning of the laser beam on, it will be traveling along the sensor) from turning on until some position, such as C, is reached. In the event the controller 24 indeed receives an hsync sensor signal for this step, it is known that at least as of position C, the apparent trailing edge is possible. Through iterations of trying laser turn-on positions closer and farther away the trailing edge, such as at positions 106, 108, 110, 112, for example, the controller will walk itself onto the actual position where the apparent trailing edge exists. Of course, some laser turn-on positions will actually fetch an hsync sensor signal while others will not. Also, because of the imperfections of trial-and-error techniques, a position that might often times fetch an hsync sensor signal (e.g., 97 times out of 100 tries), will sometimes not fetch it (e.g., 3 times out of 100 tries). In this regard, the controller will interpolate between data samples to arrive at an appropriate apparent trailing edge position. Preferably, the appropriate position is, for every X number of samples taken, where the data suggest a 50% failure point of receiving hsync sensor signals. In those instances when no hsync sensor position is observed, the controller is also prepared to issue a false hsync sensor signal within a window of expectancy. As before, this keeps ASIC firmware, for example, from becoming "lost." Especially, it maintains control signals for operating the oscillator or galvanometer in synchronization with the firmware.

Figure 8:
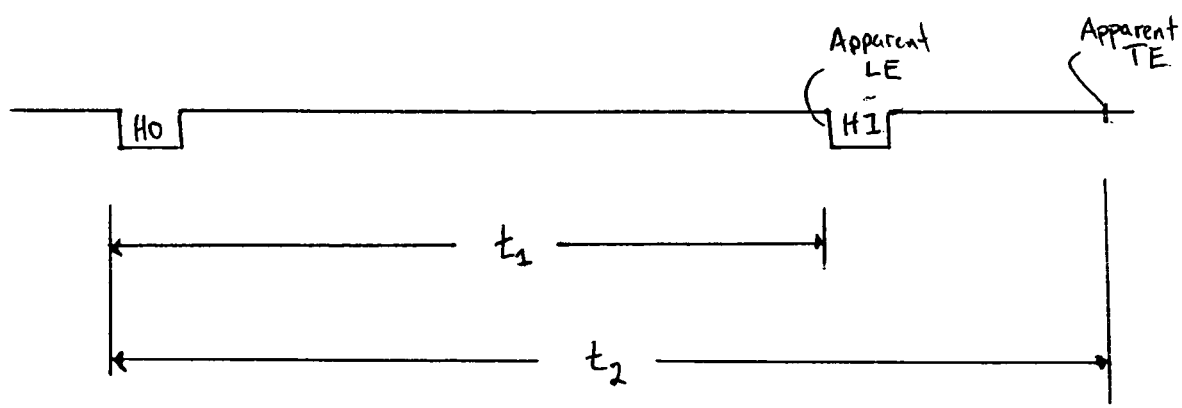
FIG. 8 is a timing diagram in accordance with the present invention of apparent leading and trailing edge times relative to a common reference point.

For either finding the apparent leading or trailing edge, skilled artisans will further appreciate both of these contain some error related to the amount of time it takes to "charge" up the sensor as the laser spot is either swept onto or off of the sensor. While the magnitude of each of these two errors is very similar, the sign of each is different. Namely, the sign of the error for the apparent leading edge is such that it the apparent leading edge is after the actual leading edge, while the sign of the error for the apparent trailing edge is such that the apparent trailing edge is before the actual trailing edge. Therefore, taking numerous samples and averaging the apparent leading and trailing edges together cancels out the error and results in knowing the location of the actual center of the sensor. This is illustrated in FIG. 8.

The measurement of the apparent leading edge also includes the amount of time that the hsync sensor signal takes to propagate back to the controller and the time for passing internal gate delays in the controller before actually processing occurs. Similarly, the measurement of the apparent trailing edge includes the amount of time it takes for the laser beam turn-on signal to propagate from the controller to the laser beam and for the beam itself to travel to the sensor. The center of the sensor is then determined by taking this into account along with the average of the apparent leading and trailing edge measurements. Accordingly, times P1 and P2 are now affirmatively known.

To use this to accurately reference an image having two scan directions, FIG. 5 teaches still another set of times known as LM0, LM1 and IW. Given that the motion of the galvanometer or oscillator FIG. 1 is fairly consistent between the forward and reverse scans, the line length of each writing line will be essentially the same. Since the line lengths are the same, the two writing lines can be aligned to each other (to achieve the desired result of FIG. 2) by lining up the end of the forward writing line with the beginning of the reverse writing line, and vice versa. To do this the following equation needs to be satisfied:

$$LM1 = T1 + P1 + P2 - LM0 - IW - T0 + NV; \text{ where}$$

T1 (already defined) is the time interval controlled and known by the controller to always equal to a target value;

LM0—the known number of pixel (pel) clocks that control the start of the writing line for the forward scan;

IW—the known number of pels that make up the image width;

P1 and P2 (already defined) and shown in FIG. 5;

TO—a temperature offset (defined below); and

NV—offset stored in NVRAM (defined below).

Since the delay of the hsync sensor changes with temperature, the alignment needs to contemplate current temperature. To accomplish this, the laser printhead assembly contains a temperature sensor (not shown) near one or more of the hsync sensors and, when P1 and P2 are measured, e.g., the calibration cycle, a current temperature is recorded. By pre-characterizing the rate of change of the delay vs. temperature during development and/or manufacturing, and storing it in code, such as in the controller, the current temperature can be looked-up in code and the rate of change of delay made known. Then, as the printhead temperature changes, the alignment is adjusted to compensate for thermal variation. This is the variable TO.

Additionally, the NV offset is stored relative to the controller (especially, in a NVRAM). Particularly, this offset represents various manufacturing differences between each EP device that cannot be fairly measured. Thus, during the manufacturing process, a test image is printed using an offset of zero. Then, this image is scanned and processed to determine the remaining misalignment between the forward and reverse scans. The delta is then stored in the NVRAM of specific EP devices and used in all future calculations of LM1. By reference, U.S. pending patent application having Ser No. 11/506424, entitled "Print Alignment for Bi-Directionally Scanning Electrophotographic Device," and filed on Aug. 18, 2006, co-owned by common assignee Lexmark International, Inc., teaches this concept in more derail and is hereby incorporated in its entirety.

As an additional consideration, it should be appreciated the above test image is only valid if it is done with the same laser power used to ascertain P1 and P2. Thus, it may be necessary to add a boost circuit, of sorts, to maintain a consistent laser power during the calibration cycle. While not fixed in form, it is expected that the boost circuit will enable switching between a fixed laser power and a variable laser power. When the laser beam is turned on for the calibration cycle, for instance, the boost circuit will switch the laser power to the fixed power. During normal imaging, on the other hand, the boost circuit will switch the laser power to the variable power during the print portion of the scan, and back to the fixed laser power for the hsync seek pulses. That way, the delay of the hsync sensors need only be characterized for the fixed laser power.

Altogether, certain advantages over the prior art should now be readily apparent. Among them, but by no means limiting: 1) if the laser power of an EP device drifts over its lifetime, the foregoing will be able to adapt and maintain proper alignment between the forward and reverse scans; 2) the physical width of a sensor, such as an hsync sensor, need not be known, simply characterized by referencing the apparent leading and trailing edges and to determine its center via the principles of symmetry; 3) the actual physical distance between forward and reverse hsync sensors, for example, need not to be known, simply characterized so that alternating scan lines can be accurately registered (according to FIG. 2); and 4) the actual velocity of a laser beam in a scan line need not be known as referencing is based upon timing.

Finally, one of ordinary skill in the art will recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A bi-directionally scanning electrophotographic device for measuring a sensor delay, the device comprising:

a photoconductor impinged with a plurality of scan lines formed in alternating directions to create a latent image;

at least one position sensor to provide a reference position of the scan lines formed in the alternating directions; and a controller that determines a latest possible position on the at least one position sensor where a laser beam can be turned on and cause the at least one position sensor to generate a signal in response, the latest possible position defining an apparent trailing edge of the at least one position sensor.

2. The device of claim 1, wherein the at least one position sensor comprises at least two position sensors to provide the reference position of the scan lines formed in the alternating directions.

3. The device of claim 1, wherein the sensor includes a periphery defining a leading edge and a trailing edge along a direction of laser scan travel.

4. The device of claim 3, wherein the controller initiates turning a laser beam on at different locations along the direction of laser scan travel relative to the at least one position sensor to determine if the sensor has been impinged upon sufficiently by the laser beam to send the signal to the controller.

5. The device of claim 3, wherein the controller determines an amount of delay in the signal from the at least one position sensor to know when to start the process of forming latent images on the photoconductor, including averaging the plurality of times relative to a reference point of multiple instances of when the at least one position sensor actually sends the signal to the controller.

6. The device of claim 1, wherein the controller determines a center of the at least one position sensor along a direction of laser beam travel based upon the determination.

7. The device of claim 4, wherein the controller determines the apparent trailing edge of the at least one position sensor based upon the laser beam being turned on at different positions.

8. The device of claim 7, wherein a center of the at least one position sensor along a direction of laser beam travel is determined based upon the apparent trailing edge of the at least one position sensor.

9. The device of claim 5, wherein the controller determines an apparent leading edge of the at least one position sensor along the direction of laser beam travel based upon the sampling.

10. The device of claim 1, wherein the controller determines an amount of delay from a time the laser beam first impinges upon the at least one position sensor to a time the at least one position sensor asserts the signal.

11. A bi-directionally scanning electrophotographic device, the device comprising:

a photoconductor impinged with a plurality of scan lines thrilled in alternating directions to create a latent image;

at least one position sensor to provide a reference position of the scan lines formed in the alternating directions, the at least one position sensor asserting a signal responsive to a laser beam impinging thereupon; and a controller that determines an amount of delay from a time the laser beam first impinges upon the at least one position sensor to a time the at least one position sensor asserts the signal.

12. The device of claim 11, wherein the controller controls activation of the laser beam and samples a plurality of times relative to a reference point multiple instances of when the at least one sensor actually sends the signal to the controller.

13. The device of claim 12, wherein the controller determines a center of the at least one position sensor based upon the samples.

14. The device of claim 11, wherein the controller samples a plurality of times relative to a reference point multiple instances of when the at least one sensor actually sends the signal to the controller and averages the sampled times to determine the amount of delay.

15. The device of claim 11, wherein controller turns the laser beam on at different locations along the direction of laser scan travel to determine if the at least one position sensor has been impinged upon sufficiently by the laser beam to send the signal to the controller.

16. The device of claim 15, wherein the controller determines an apparent trailing edge of the at least one position sensor based upon turning on the laser beam at different locations, and determines a center of the at least one position sensor based upon the apparent trailing edge thereof.

* * * * *